US012457114B2

(12) United States Patent
Fu et al.

(10) Patent No.: US 12,457,114 B2
(45) Date of Patent: Oct. 28, 2025

(54) RELAY UE AND REMOTE UE AUTHORIZATION

(71) Applicant: Telefonaktiebolaget LM Ericsson (publ), Stockholm (SE)

(72) Inventors: Zhang Fu, Stockholm (SE); Monica Wifvesson, Lund (SE); Shabnam Sultana, Montreal (CA); Juying Gan, Shanghai (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 288 days.

(21) Appl. No.: 18/031,183

(22) PCT Filed: Oct. 11, 2021

(86) PCT No.: PCT/IB2021/059294
§ 371 (c)(1),
(2) Date: Apr. 11, 2023

(87) PCT Pub. No.: WO2022/079572
PCT Pub. Date: Apr. 21, 2022

(65) Prior Publication Data
US 2023/0379168 A1    Nov. 23, 2023

(30) Foreign Application Priority Data
Oct. 12, 2020   (WO) ................ PCT/CN2020/120324

(51) Int. Cl.
*H04L 9/40*    (2022.01)
*H04L 9/32*    (2006.01)
(Continued)

(52) U.S. Cl.
CPC .......... *H04L 9/3247* (2013.01); *H04L 9/3213* (2013.01); *H04W 12/06* (2013.01); *H04W 16/26* (2013.01)

(58) Field of Classification Search
CPC ........................ H04L 9/3247; H04L 9/3213
See application file for complete search history.

(56) References Cited

U.S. PATENT DOCUMENTS

| 8,417,949 | B2 * | 4/2013 | Zhang ................ H04L 63/0869 |
| | | | 713/168 |
| 11,678,016 | B1 * | 6/2023 | Antony ............. H04N 21/4623 |
| | | | 725/25 |

(Continued)

FOREIGN PATENT DOCUMENTS

WO   WO-2015171750 A1 *  11/2015 ............. H04B 7/155
WO   WO-2018031343 A1 *   2/2018

OTHER PUBLICATIONS

International Search Report and Written Opinion issued in International Application No. PCT/IB2021/059294 dated Dec. 22, 2021 (10 pages).

(Continued)

*Primary Examiner* — William S Powers
(74) *Attorney, Agent, or Firm* — Sonoda & Kobayashi Intellectual Property Law; Darren M. Gardner

(57) ABSTRACT

A method performed by a relay UE for determining whether the relay UE may provide a relay service to a remote UE. The method includes the relay UE receiving from the remote UE a first message comprising a first authorization token and a first digital signature for verifying the authenticity of the first authorization token, wherein the first digital signature was generated by a first network function using the first authorization token and a first key, and the first authorization token indicates whether or not the remote UE is authorized to utilize a relay service provided by the relay UE. The method further includes the relay UE verifying the authenticity of the first authorization token.

14 Claims, 10 Drawing Sheets

(51) Int. Cl.
    *H04W 12/06*    (2021.01)
    *H04W 16/26*    (2009.01)

(56) References Cited

U.S. PATENT DOCUMENTS

2017/0195407 A1* 7/2017 Miura .................. H04L 67/146
2018/0375647 A1* 12/2018 Yan ........................ H04L 9/14
2020/0100088 A1 3/2020 Kim et al.

OTHER PUBLICATIONS

International Preliminary Report on Patentability issued in International Application No. PCT/IB2021/059294 dated Mar. 10, 2023 (26 pages).
Hardt, D., "The OAuth 2.0 Authorization Framework", Internet Engineering Task Force (IETF), Request for Comments (RFC) 6749, Microsoft, Oct. 2012 (76 pages).
3GPP TS 23.303 V15.1.0 (Jun. 2018), 3rd Generation Partnership Project; Technical Specification Group Services and System Aspects; Proximity-based services (ProSe); Stage 2 (Release 15), Jun. 2018 (130 pages).
3GPP TS 23.287 V17.0.0 (Jun. 2021), 3rd Generation Partnership Project; Technical Specification Group Services and System Aspects; Architecture enhancements for 5G System (5GS) to support Vehicle-to-Everything (V2X) services (Release 17), Jun. 2021 (59 pages).
3GPP TR 23.752 V17.0.0 (Mar. 2021), 3rd Generation Partnership Project; Technical Specification Group Services and System Aspects; Study on system enhancement for Proximity based Services (ProSe) in the 5G System (5GS) (Release 17), Mar. 2021 (183 pages).
3GPP TR 23.752 V0.5.0 (Sep. 2020), 3rd Generation Partnership Project; Technical Specification Group Services and System Aspects; Study on system enhancement for Proximity based Services (ProSe) in the 5G System (5GS) (Release 17), Sep. 2020 (162 pages).
3GPP TS 23.502 V0.6.0 (Aug. 2017), 3rd Generation Partnership Project; Technical Specification Group Services and System Aspects; Procedures for the 5G Stage 2 (Release 15), Aug. 2017 (148 pages).
ETSI TS 123 502 V16.5.1 (Sep. 2020), 5G; Procedures for the 5G System (5GS), (3GPP TS 23.502 version 16.5.1 Release 16), Sep. 2020 (597 pages).
ETSI TS 123 303 V16.0.0 (Jul. 2020), Universal Mobile Telecommunications System (UMTS); LTE; Proximity-based services (ProSe); Stage 2, (3GPP TS 23.303 version 16.0.0 Release 16), Jul. 2020 (133 pages).
ETSI TS 133 303 V16.0.0 (Aug. 2020), Universal Mobie Telecommunications System (UMTS); LTE; Proximity-based Services (ProSe); Security aspects (3GPP TS 33.303 version 16.0.0 Release 16), Aug. 2020 (92 pages).
ETSI TS 123 287 V16.4.0 (Oct. 2020), 5G; Architecture enhancements for 5G System (5GS) t support Vehicle-to-Everything (V2X) services (3GPP TS 23.287 version 16.4.0 Release 16), Aug. 2020 (60 pages).
3GPP TR 23.752 V0.3.0 (Jan. 2020), 3rd Generation Partnership Project; Technical Specification Group Services and System Aspects; Study on system enhancement for Proximity based Services (ProSe) in the 5G System (5GS) (Release 17), Jan. 2020 (73 pages).

\* cited by examiner

RELAY UE AND REMOTE UE AUTHORIZATION

CROSS REFERENCE TO RELATED APPLICATIONS

This application is a 35 U.S.C. § 371 National Stage of International Patent Application No. PCT/IB2021/059294, filed 2021 Oct. 11, which claims priority to International Patent Application No. PCT/CN2020/120324, filed on 2020 Oct. 12, which is incorporated by this reference.

TECHNICAL FIELD

Disclosed are embodiments related to determining whether a user equipment (UE) is authorized to provide or utilize a relay service.

BACKGROUND

FIG. 1 shows the high level view of the non-roaming 5G System (5GS) architecture for vehicle-to-everything (V2X) communication over the PC5 and Uu reference points. Two user equipments (UEs) can communicate with each other either directly via a PC5 sidelink (SL) interface or they can communicate with each other through the Uu interface and via an application server function (AS). A UE is any device (e.g., smartphone, computer, tablet, sensor, appliance, vehicle, etc.) capable of wireless communication with another device (e.g., another UE or an access point, such as a base station).

3GPP TR 23.752 V0.3.0 ("TR 23.752") solution #6 describes the basic idea of the Layer-3 UE-to-Network relay (a.k.a., "relay UE"). As described in TR 23.752, the ProSe 5G relay UE entity provides the functionality to support connectivity to the network for remote UEs. The relay UE entity can be used for both public safety services and commercial services (e.g. interactive service).

1. Background of the SL interface

The first standardization effort in 3GPP for the SL interface dates back to release 12 (Rel-12), which targeted public safety use cases. The SL interface is specified to allow a UE to send data packets directly to a peer UE (i.e., without sending the data packets to the NW). Additionally, a UE-to-NW relay solution is also defined such that a first UE (the "remote UE") can reach the NW via another UE (the "relay UE") even when the remote UE is out of the network's cell coverage. The remote UE communicates with the relay UE using the SL interface and the relay UE has uplink and downlink connection with the network.

Since Rel-12, a number of enhancements have been introduced with the objective to enlarge the use cases that could benefit from the device-to-device technology (e.g., PC5 SL interface). In particular, in LTE Rel-14 and Rel-15, the extensions for the D2D work consist of support of vehicle-to-everything (V2X) communications, including any combination of direct communications between vehicles, pedestrians and the infrastructure.

While LTE V2X mainly aims at traffic safety services, 3GPP's New Radio (NR) V2X has a much broader scope including not only basic safety services but also targeting non-safety applications, such as sensor/data sharing between vehicles with the objective to strengthen the perception of the surrounding environment. Hence a new set of applications, such as vehicle platooning, cooperative maneuver between vehicles, remote/autonomous driving may enjoy such enhanced sidelink framework.

For NR sidelink (SL), unicast at access stratum is supported for services requiring high reliability. Between the a UE pair (e.g., a remote UE utilizing a relay service provided by a relay UE), there can be multiple SL unicast links and each link can support multiple SL QoS flows/radio bearers as illustrated in FIG. 2 (see 3GPP TS 23.287). At access stratum, each link can be identified by the source and destination Layer 2 identity (L2 ID). For instance, the PC5 unicast link 1 in FIG. 2 can be identified by the pair of L2 ID1 (i.e. corresponding to application ID1) and L2 ID2 (i.e. corresponding to application ID2).

2. Proximity Services (ProSe)

2.1 ProSe Direct Discovery Models

3GPP TS 23.303 defines ProSe Direct Discovery Models in section 5.3.1.2. The following models for ProSe Direct Discovery exist: 1) Model A ("I am here") and 2) Model B ("who is there" or "are you there").

2.1.1 Model A Discovery

This model defines two roles for the ProSe-enabled UEs that are participating in ProSe Direct Discovery: 1) Announcing UE—the UE announces certain information that could be used by UEs in proximity that have permission to discover; and 2) Monitoring UE—the UE that monitors certain information of interest in proximity of announcing UEs. In this model the announcing UE broadcasts discovery messages at pre-defined discovery intervals and the monitoring UEs that are interested in these messages read them and process them. This model is equivalent to "I am here" since the announcing UE would broadcast information about itself (e.g. its ProSe Application Code in the discovery message). Both open and restricted discovery types are supported by Model A.

2.1.1 Model B Discovery ("Who is There?"/"are You There?")

This model, when restricted discovery type is used, defines two roles for the ProSe-enabled UEs that are participating in ProSe Direct Discovery: i) Discoverer UE—the UE transmits a request containing certain information about what it is interested to discover; and 2) Discoveree UE—the UE that receives the request message can respond with some information related to the discoverer's request. This model is equivalent to "who is there/are you there" because the discoverer UE sends information about other UEs that the discoverer would like to receive responses from (e.g. the information can be about a ProSe Application Identity corresponding to a group and the members of the group can respond). The Public Safety discovery is considered restricted. The monitoring UE/discoverer UE needs to have authorization (such as through pre-provisioned parameters) to perform discovery of the appropriate service(s).

2.2 Direct Communication Via ProSe UE-to-Network Relay

3GPP TS 23.303 defines the "Direct communication via ProSe UE-to-Network Relay" in section 5.4.4. With this procedure, a ProSe UE-to-Network Relay capable UE may attach to the network (if it is not already connected) and connect to a PDN connection enabling the necessary relay traffic. FIG. 3 shows the call flow of the corresponding procedure. The Remote UE performs discovery of a ProSe UE-to-Network Relay using Model A or Model B discovery. The details of this procedure are described in section 5.3.7 of 3GPP TS 23.303.

TS 23.303 defines the Identifiers for ProSe UE-to-Network Relay discovery and selection in section 4.6.4.3.

The following parameters are used in the UE-to-Network Relay Discovery Announcement message (Model A):

ProSe Relay UE ID: link layer identifier that is used for direct communication and is associated with a Relay Service Code. A UE-to-Network Relay shall have a distinct ProSe Relay UE ID for each Relay Service Code. For support of multiple PDN Connections, the ProSe UE-to-Network Relay is assigned a different ProSe Relay UE ID for each PDN Connection.
Announcer Info: provides information about the announcing user.
Relay Service Code: parameter identifying a connectivity service the ProSe UE-to-Network Relay provides to Public Safety applications. The Relay Service Codes are configured in a ProSe UE-to-Network Relay for advertisement. Additionally, the Relay Service Code also identifies authorized users the ProSe UE-to-Network Relay would offer service to, and may select the related security policies or information e.g. necessary for authentication and authorization between the Remote UE and the ProSe UE-to-Network Relay (e.g. a Relay Service Code for relays for police members only would be different than a Relay Service Code for relays for Fire Fighters only, even though potentially they provided connectivity to same APN e.g. to support Internet Access).

The following parameters are used in the UE-to-Network Relay Discovery Solicitation message (Model B):

Discoverer Info: provides information about the discoverer user.
Relay Service Code: information about connectivity that the discoverer UE is interested in. The Relay Service Codes are configured in the Remote UEs interested in related connectivity services.
ProSe Relay UE ID: link layer identifier of a UE-to-Network Relay that is used for direct communication and is associated with a Relay Service Code. A UE-to-Network Relay shall have a distinct ProSe Relay UE ID for each Relay Service Code. The ProSe Relay UE ID is optional.

The following parameters are used in the UE-to-Network Relay Discovery Response message (Model B):

ProSe Relay UE ID: link layer identifier that is used for direct communication and is associated with a Relay Service Code. A UE-to-Network Relay shall have a distinct ProSe Relay UE ID for each Relay Service Code.
Discoveree Info: provides information about the discoveree 2.3 Unicast Link Setup in V2X Defined in TS 23.287

FIG. 4 shows the layer-2 link establishment procedure for unicast mode of V2X communication over PC5 reference point.
1. The UE(s) determine the destination Layer-2 ID for signalling reception for PC5 unicast link establishment as specified in clause 5.6.1.4 in TS 23.287. The destination Layer-2 ID is configured with the UE(s) as specified in clause 5.1.2.1 in TS 23.287.
2. The V2X application layer in UE-1 provides application information for PC5 unicast communication. The application information includes the service type(s) (e.g. PSID or ITS-AID) of the V2X application and the initiating UE's Application Layer ID. The target UE's Application Layer ID may be included in the application information. The V2X application layer in UE-1 may provide V2X Application Requirements for this unicast communication. UE-1 determines the PC5 QoS parameters and PFI as specified in clause 5.4.1.4 in TS 23.287.
3. UE-1 sends a Direct Communication Request message to initiate the unicast layer-2 link establishment procedure. The Direct Communication Request message includes one or more of the following:

i) Source User Info: the initiating UE's Application Layer ID (i.e. UE-1's Application Layer ID);
ii) Target User Info: the target UE's Application Layer ID (i.e. UE-2's Application Layer ID) if the V2X application layer provided the target UE's Application Layer ID in step 2;
iii) V2X Service Info: the information about V2X Service(s) requesting Layer-2 link establishment (e.g. PSID(s) or ITS-AID(s));
iv) Indication whether IP communication is used.
v) IP Address Configuration: For IP communication, IP address configuration is required for this link and indicates one of the following values: a) "IPv6 Router" if IPv6 address allocation mechanism is supported by the initiating UE, i.e., acting as an IPv6 Router; or b) "IPv6 address allocation not supported" if IPv6 address allocation mechanism is not supported by the initiating UE;
vi) Link Local IPv6 Address: a link-local IPv6 address formed locally based on RFC 4862 if UE-1 does not support the IPv6 IP address allocation mechanism, i.e. the IP Address Configuration indicates "IPv6 address allocation not supported";
vii) QoS Info: the information about PC5 QoS Flow(s). For each PC5 QoS Flow, the PFI and the corresponding PC5 QoS parameters (i.e. PQI and conditionally other parameters such as MFBR/GFBR, etc).

The source Layer-2 ID and destination Layer-2 ID used to send the Direct Communication Request message are determined as specified in clauses 5.6.1.1 and 5.6.1.4. UE-1 sends the Direct Communication Request message via PC5 broadcast using the source Layer-2 ID and the destination Layer-2 ID.

4. A Direct Communication Accept message is sent to UE-1 as below:
4a. (UE oriented Layer-2 link establishment) If the Target User Info is included in the Direct Communication Request message, the target UE, i.e. UE-2 responds with a Direct Communication Accept message.
4b. (V2X Service oriented Layer-2 link establishment) If the Target User Info is not included in the Direct Communication Request message, the UEs that are interested in using the announced V2X Service(s), so decide to establish Layer-2 link with UE-1 respond to the request by sending a Direct Communication Accept message (UE-2 and UE-4 in FIG. 6.3.3.1-1).

The Direct Communication Accept message includes:
i) Source User Info: Application Layer ID of the UE sending the Direct Communication Accept message;
ii) QoS Info: the information about PC5 QoS Flow(s). For each PC5 QoS Flow, the PFI and the corresponding PC5 QoS parameters requested by UE-1 (i.e. PQI and conditionally other parameters such as MFBR/GFBR, etc);
iii) IP Address Configuration: For IP communication, IP address configuration is required for this link and indicates one of the following values: a) "IPv6 Router" if IPv6 address allocation mechanism is supported by the target UE, i.e., acting as an IPv6 Router; or b) "IPv6 address allocation not supported" if IPv6 address allocation mechanism is not supported by the target UE; and
iv) Link Local IPv6 Address: a link-local IPv6 address formed locally based on RFC 4862 if the target UE does not support the IPv6 IP address allocation mechanism, i.e. the IP Address Configuration indicates "IPv6 address allocation not supported", and UE-1 included a link-local IPv6 address in the Direct Communication Request message. The target UE shall include a non-conflicting link-local IPv6 address.

If both UEs (i.e. the initiating UE and the target UE) selected to use link-local IPv6 address, they shall disable the duplicate address detection defined in RFC 4862.

When either the initiating UE or the target UE indicates the support of IPv6 router, corresponding address configuration procedure would be carried out after the establishment of the layer 2 link, and the link-local IPv6 addresses are ignored.

The source Layer-2 ID used to send the Direct Communication Accept message is determined as specified in clauses 5.6.1.1 and 5.6.1.4. The destination Layer-2 ID is set to the source Layer-2 ID of the received Direct Communication Request message.

Upon receiving the Direct Communication Accept message from peer UE, UE-1 obtains the peer UE's Layer-2 ID for future communication, for signaling and data traffic for this unicast link.

The V2X layer of the UE that established PC5 unicast link passes the PC5 Link Identifier assigned for the unicast link and PC5 unicast link related information down to the AS layer. The PC5 unicast link related information includes Layer-2 ID information (i.e. source Layer-2 ID and destination Layer-2 ID). This enables the AS layer to maintain the PC5 Link Identifier together with the PC5 unicast link related information.

5. V2X service data is transmitted over the established unicast link. For example, the PC5 Link Identifier and PFI are provided to the AS layer, together with the V2X service data. UE-1 sends the V2X service data using the source Layer-2 ID (i.e. UE-1's Layer-2 ID for this unicast link) and the destination Layer-2 ID (i.e. the peer UE's Layer-2 ID for this unicast link). NOTE 2: PC5 unicast link is bi-directional, therefore the peer UE of UE-1 can send the V2X service data to UE-1 over the unicast link with UE-1.

SUMMARY

Certain challenges presently exist. For example, when a remote UE wants to utilize a relay (UE-to-Network relay or UE-to-UE relay) service provided by a relay UE, the remote UE needs to determine whether the relay UE is authorized to provide the desired relay service, and, similarly, the relay needs to determine whether the remote UE is authorized to utilize the relay service. Some solutions to this authorization issue exist (see, e.g., 3GPP TR 23.752, e.g. solution #30, 40,46,47. Also TS 33.303 clause 6.7), but a problem with these existing solutions is that they rely on the network to perform the authorization check. For example, in an existing solution, the relay UE sends an authorization request to the network and the network will determine if the remote UE can use the relay service. Accordingly, this solution will not work if the relay UE is out of coverage. Additionally, the existing solutions are not considering UE-to-UE relay use case.

Accordingly, in one aspect there is provided a method performed by a relay UE for determining whether the relay UE may provide a relay service to a remote UE. The method includes the relay UE receiving from the remote UE a first message comprising a first authorization token and a first digital signature for verifying the authenticity of the first authorization token. The first digital signature was generated by a first network function using the first authorization token and a first key, and the first authorization token indicates whether or not the remote UE is authorized to utilize a relay service provided by the relay UE. The method also includes relay UE verifying the authenticity of the first authorization token.

In another aspect there is provided a computer program comprising instructions which when executed by processing circuitry of a relay UE, causes the relay UE to perform the relay UE methods disclosed herein. In another aspect there is provided a carrier containing the computer program, wherein the carrier is one of an electronic signal, an optical signal, a radio signal, and a computer readable storage medium.

In another aspect there is provided a relay UE where the relay UE is adapted to perform the relay UE methods disclosed herein. In some embodiments, the relay UE includes processing circuitry and a memory containing instructions executable by the processing circuitry, whereby the relay UE is operative to perform the relay UE methods disclosed herein.

In another aspect there is provided a method performed by a remote UE for determining whether a relay UE may provide a relay service to the remote UE. The method includes the remote UE receiving from the relay UE a first message comprising a first authorization token and a first digital signature for verifying the authenticity of the first authorization token. The first digital signature was generated by a first network function using the first authorization token and a first key, and the first authorization token indicates whether or not the relay UE is authorized to provide a relay service to the remote UE. The method also includes the remote UE verifying the authenticity of the first authorization token.

In another aspect there is provided a computer program comprising instructions which when executed by processing circuitry of a remote UE, causes the remote UE to perform the remote UE methods disclosed herein. In another aspect there is provided a carrier containing the computer program, wherein the carrier is one of an electronic signal, an optical signal, a radio signal, and a computer readable storage medium.

In another aspect there is provided a remote UE where the remote UE is adapted to perform the remote UE methods disclosed herein. In some embodiments, the remote UE includes processing circuitry and a memory containing instructions executable by the processing circuitry, whereby the remote UE is operative to perform the remote UE methods disclosed herein.

In another aspect there is provided a method performed by a first network node. The method includes receiving a first request message and transmitting a first response message responsive to the first request message. The first response message comprises an authorization token and a digital signature for verifying the authenticity of the authorization token, the digital signature was generated using a first key, and the authorization token indicates at least one of: i) that a UE is authorized to utilize a relay service provided by one or more relay UEs or ii) that the UE is authorized to provide a relay service to one or more remote UEs.

In another aspect there is provided a computer program comprising instructions which when executed by processing circuitry of a network node, causes the network node to perform the network node methods disclosed herein. In another aspect there is provided a carrier containing the computer program, wherein the carrier is one of an electronic signal, an optical signal, a radio signal, and a computer readable storage medium.

In another aspect there is provided a network node where the network node is adapted to perform the network node methods disclosed herein. In some embodiments, the network node includes processing circuitry and a memory containing instructions executable by the processing circuitry, whereby the network node is operative to perform the network node methods disclosed herein.

An advantage of the embodiments disclosed herein is that they do not require a network to be involved in the mutual verification phase, and, thus, the embodiments are not only especially useful when the remote UE and relay UE are out of network coverage, but also reduce the amount of network signaling that is required, thereby reducing network load. The embodiments also work for both UE-to-Network relay use case and UE-to-UE relay use case.

BRIEF DESCRIPTION OF THE DRAWINGS

The accompanying drawings, which are incorporated herein and form part of the specification, illustrate various embodiments.

DETAILED DESCRIPTION

Figure 5:
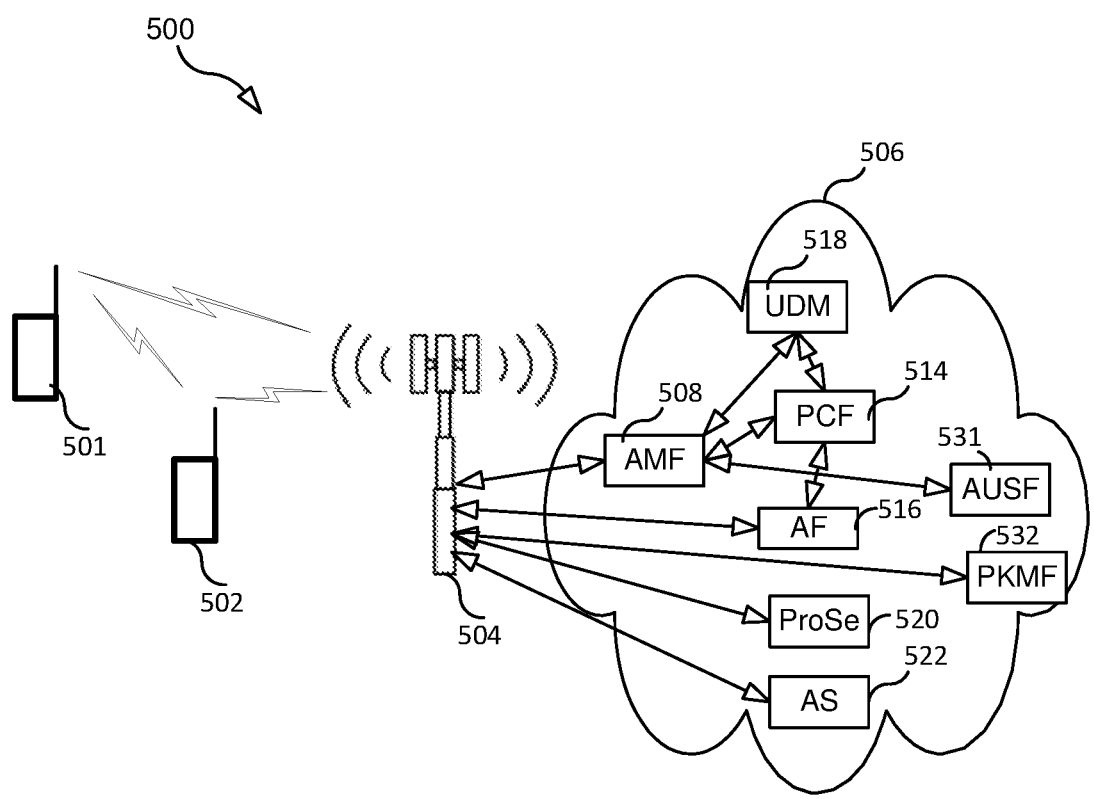
FIG. 5. illustrates a system according to an embodiment.

FIG. 5 illustrates a system 500 according to an embodiment. In this example, system 500 is a 5G system (5GS). System 500 includes a first UE 501 (referred to herein as the "remote" UE) and a second UE 502 (referred to herein as the "relay" UE), which may function as a UE-to-Network (UE-NW) relay or a UE-to-UE (UE-UE) relay (e.g., a UE-UE relay as defined in 5GPP TR 23.752). System 500 also includes a radio access network (RAN) access point AP 504 (a.k.a., "base station 504"), which in this example is a Next Generation (NG) RAN (NG-RAN) base station (denoted "gNB"), a core network 506, which in this example is a 5G core network (5GC). As shown in FIG. 5, 5GC includes at a Access and Mobility Management Function (AMF) 508, a User Plane Function (UPF) 512, a Policy Control Function (PCF) 514, an Application Function (AF) 516, and User Data Management (UDM) function 518.

This disclosure describes use of verifiable authorization tokens to overcome the shortcomings of the existing solutions. For example, in one embodiment, the remote UE 501 may have a verifiable authorization token that specifies the types of relay services that the remote UE 501 may use and the relay UE 502 has a verifiable authorization token that specifies the types of relay services that the relay UE 502 is authorized to provide. The remote UE 501 may provide its authorization token to the relay UE 502 so that the relay UE 502 can determine whether the remote UE 501 is authorized to utilize the service proved by the relay UE 502, and, likewise, the relay UE 502 provides its authorization token to the remote UE 501 so that the remote UE 501 can determine whether the relay UE 502 is authorized to provide the relay service that the remote UE would like to utilize.

Figure 6:
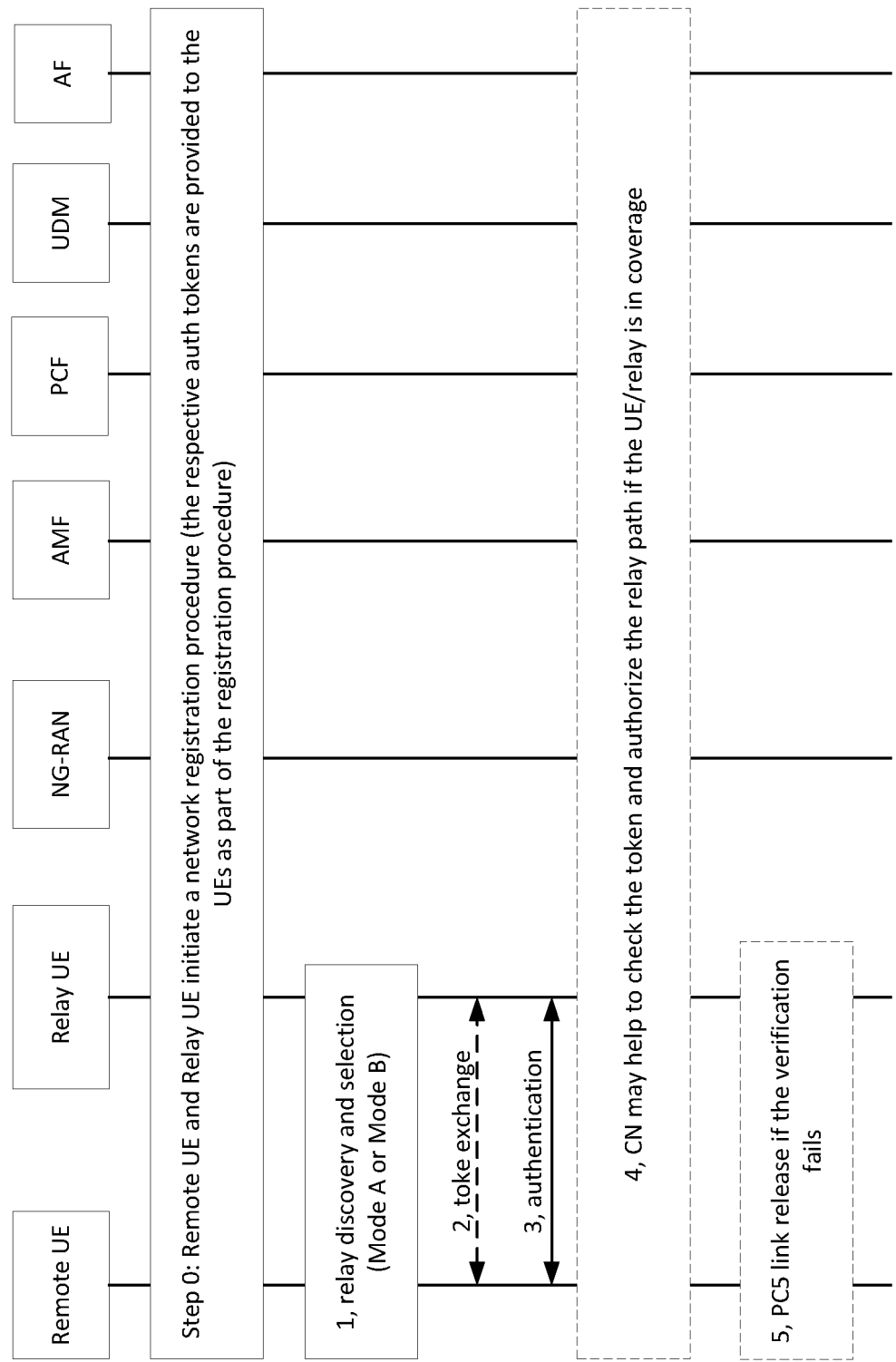
FIG. 6. is a message flow diagram illustrating a message flow according to an embodiment.

FIG. 6 illustrates steps according to an embodiment.

In step 0, the relay UE and the remote UE each initiate a registration procedure to register with the core network (CN). Relay UE and remote UE may perform this step at different times. During each respective registration procedure, the CN provides an authorization (auth) certificate to relay UE and remote UE, respectively. Each auth certificate contains an authorization token (auth token) and a corresponding digital signature (e.g., an encrypted hash value) for verifying the authenticity of the auth token. The auth token provided to relay UE states what kind of relaying service it can provide and other policies (e.g. to what kinds of remote UE the relay will provide service). The auth token provided to the remote UE states what kind of relaying service it can utilize and other policies (e.g. what kinds of relay the remote UE can use, etc.). Each auth token may have expiration time. Additionally, digital signature is signed with the private key of the CN. The CN also provides the corresponding public key to UEs for verifying the token from other UEs.

In addition to information defined in reference [5], the auth token may include one or more of the following:
1) UE identifier (e.g. UE's SUPI, SUCI, GPSI, Application User ID, or public key);
2) an indication that the UE can provide a relay service;
3) an indication that the UE can utilize a relay service;
4) an expiration time;
5) service types, application types, traffic types the UE supports;
6) PLMN IDs that the UE is authorized to access;
7) geographical area limitations;
8) (For a relay UE): types of remote UE (e.g. used for public safety or commercial use cases) it can support, type of relaying (layer-2 relaying or Layer-3 relaying) it can support, network slices and data networks that the relay can access;
9) (For a remote UE): type of relay UE (e.g. used for public safety or commercial use cases) it can connect, type of relaying (layer-2 relaying or Layer-3 relaying) it can support, network slices and data networks that the relay can access; (Optional) indication of the token shall be verified by the core network; QoS related info: e.g. maximum bit rate of traffic to be relayed.

In step 1, the remote UE and the relay UE perform a discovery and selection procedure, e.g. via Mode A or Mode B as described above.

For example, the relay UE can include its auth certificate in an Announce Message in Mode A discovery. The remote UE can then use the digital signature included in the auth certificate and the public key corresponding to the private key that was used to generate the digital signature to verify the authenticity of the relay UE's auth token and can then decide whether to use the relay service according to what is stated in the relay UE's auth token and its own policy.

In Mode B discovery, the remote UE can include its auth certificate in the Solicitation Message. When the relay UE receives the auth certificate from the remote UE, the relay UE can verify the remote UE's auth token (i.e., the relay UE can use the digital signature included in the remote UE's auth certificate and the public key corresponding to the private key that was used to generate the digital signature to verify the authenticity of the remote UE's auth token). If the remote UE's auth token is verified, the relay UE sends back a Response Message containing relay UE's auth certificate (i.e., auth token plus digital signature). A UE can also include its auth certificate in the Direct Communication Request message if it is used in the relay discovery procedure.

Regarding the auth token verification, the receiving side can use the appropriate public key (i.e., the public key paired with the private key that was used by the CN to generate the digital signature included in the auth certificate) to verify the auth token and check the policies/claims in the token and decide whether or not to continue the procedure. As an example, when the relay UE receives an auth certificate from the remote UE, the relay UE performs the following steps to verify the authenticity and integrity of the auth token included in the auth certificate: 1) input the auth token into a hash function to produce a first hash value; 2) decrypt the digital signature using the public key that is paired with the private key that was used to generate the digital signature, thereby producing a second hash value; and 3) determine whether the first hash value is identical to the second hash value. If the hash values are identical, then relay UE has successfully verified that the auth token is authentic and has not been tampered with.

In step 2, Remote UE and relay UE exchange their auth certificates if the exchange has not already taken place in step 1. If privacy is required, i.e. the auth token should not be revealed to third parties, then the auth token should be transferred with encryption. In this case, it is recommended that the tokens are exchanged in step 2 after the unicast PC5 link is established and has security protected.

In step 3, the relay UE and the remote UE do mutual authentication. This step is usually included in the PC5 link establishment procedure. For example, the remote UE's auth token may include a UE identifier and the relay UE may use the UE identifier to determine whether the remote UE is the UE identified by the UE identifier. For instance, the UE identifier may by the remote UE's public key. In this case, the remote UE may include in the message that contains the remote UE's auth certificate that it provides to the relay UE a digital signature that the remote UE generated using the auth token and the private key belonging to the remote UE. For example, the remote UE may input the auth token into a hash function to produce a hash value and then encrypt the hash value using its private key—this encrypted hash value is then used as the digital signature. The relay UE, in this case, will then: 1) input the auth token into a hash function to produce a hash value; 2) use the public key included in the auth token to decrypt the digital signature; and then 3) determine whether the hash value generated in step 1 is identical to the decrypted digital signature. The remote UE will perform the same process using the digital signature and public key provided by the relay UE.

In step 4, if needed, the relay UE and/or remote UE can send the received auth certificate to the CN to allow the CN to verify the auth token included in the auth certificate.

In step 5, if the mutual verification fails or the remote UE and the relay UE cannot connect to each other due to policy conflicts, they may release the PC5 link.

1. Generation of the Authorization Certificates

Regarding which entity generates the authorization certificates, there are several options, as described below.

Figure 7:
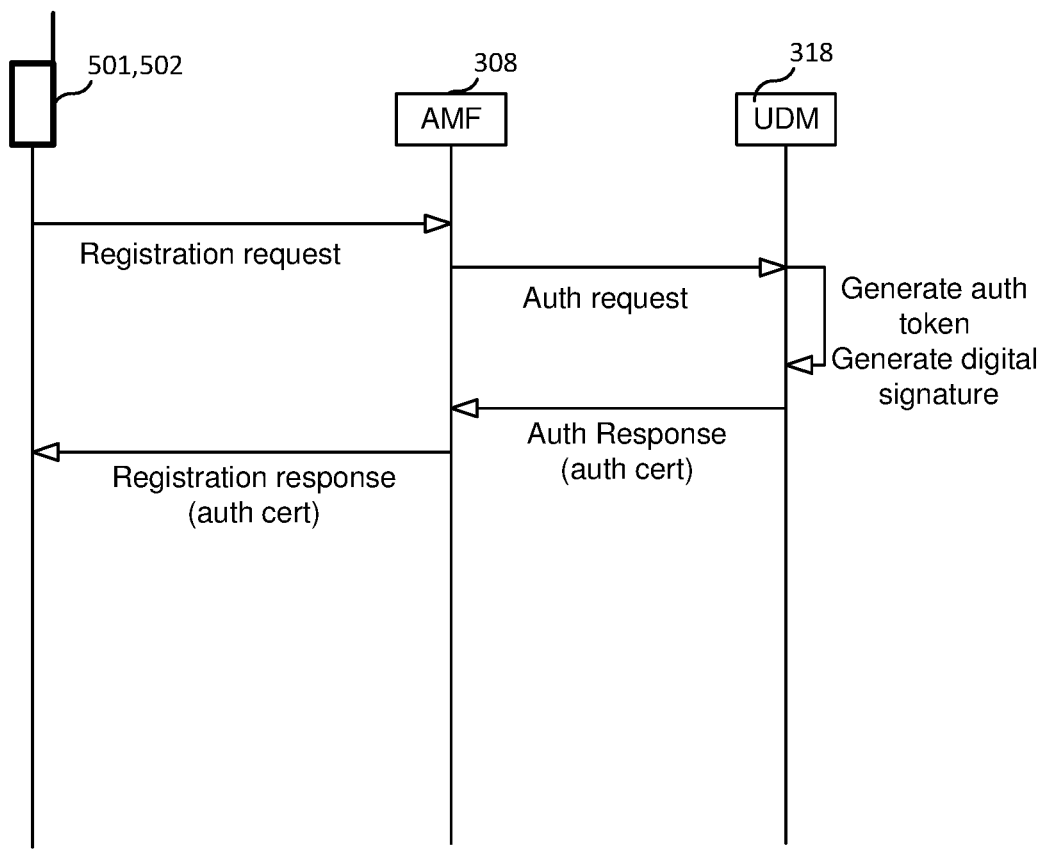
FIG. 7. is a message flow diagram illustrating a message flow according to an embodiment.

1.1 Authorization Certificate is Generated by a Core Network (CN) Function:

FIG. 7 is a message flow diagram according to some embodiments. In this embodiment the UDM generates the auth certificate for UE 501,502 as part of a registration procedure. That is, the UE 501,502 transmits a registration request message that is received by the AMF. The registration request message may include an indication that the UE that transmitted the registration request message wants to utilize a relay service or provide a relay service.

After receiving the registration request message, the AMF sends to the UDM an authorization request message that includes a UE identifier for the UE. For instance, in one embodiment, the AMF sends to the UDM a Nudm_SDM_Get message that includes the UE ID as well as a data type indicator indicating the type of data that the AMF is requesting the UDM to provide, which in this example is set to "ProSe subscription data," and an authorization token indicator set to "yes," which indicates that the AMF is requesting the UDM to provide to the AMF an authorization token (auth token) for the UE. Alternatively, a new type of message can be defined, for example, a "ProSe_Token_Request" message. In this alternative embodiment, after receiving the registration request message, the AMF sends to the UDM a ProSe_Token_Request message that contains the UE ID.

The UDM then uses the UE ID to obtain subscription information linked to the UE identifier (e.g., in this case ProSe subscription data), and, based on the subscription information (and information from the PCF, if any), generates an auth token for the UE. Additionally, the UDM uses its private key to generate a digital signature. For example, UDM inputs the auth token into a hash function to generate a hash value and then encrypts the hash value using its private key—this encrypted hash value is digital signature.

Next, the UDM transmits to the AMF an auth response message that contains the auth token and the digital signature (i.e., the "auth certificate"). The auth response message may also include the public key that is paired with the private key that the UDM used to generate the digital signature. As shown in FIG. 7, the response transmitted by the UDM may also contain the ProSe subscription data for the UE.

After receiving the response from the UDM, the AMF then transmits to the UE 501,502 a registration response message that contain the auth certificate (i.e., auth token and digital signature) received from the UDM. The registration response message may also include the above mentioned public key. Accordingly, in one embodiment, AMF sends the authorization request to the UDM during UE registration phase, UDM generates the authorization token for the UE by checking the UE subscription data and collaborating with PCF for mobility and access policies.

In another embodiment, the authorization token can be generated by a ProSe Function 520 (defined in TS 23.303). The UE access the ProSe function to do the authorization, and the ProSe Function checks the UE's profile, may be by interacting with HSS and ProSe Application server function, and generates authorization token to the UE.

In 5GS, a new Network Function can be defined that can interact with UDM, PCF and ProSe Application Server function. When UE is registering in the network, it indicates that it is capable to be a remote UE and/or a relay UE, then the AMF sends authorization token request (e.g., the ProSe_Token_Request) to the new Network Function to get the token.

As noted above, when the token generator (e.g. UDM or other specific NF in 5GC or ProSe Function in EPC) generates the authorization token, it shall digital sign the token, so that the token cannot be modified or forged by an attacker. The token generator can use a private key to sign the token and the token can be verified by the corresponding public key.

In one embodiment, the token generator can generate the public/private key pair and provide the public key to the UE when it grants the token to the UE. The UE can use the key to verify tokens of other UEs.

In another embodiment, an Authentication Sever Function (AUSF) 531 or ProSe Key Management Function 532 (PKMF, defined in 3GPP TS 33.303) can be responsible for the public/private key management. For example, AUSF or PKMF may provide the private key to the token generator for signing the token. The AUSF may provide the public key for verifying tokens during the UE registration phase; alternatively, the PKMF can provide the public key to the UE when the UE acquires other security parameters for ProSe communication as defined in TS 33.303.

Figure 1:
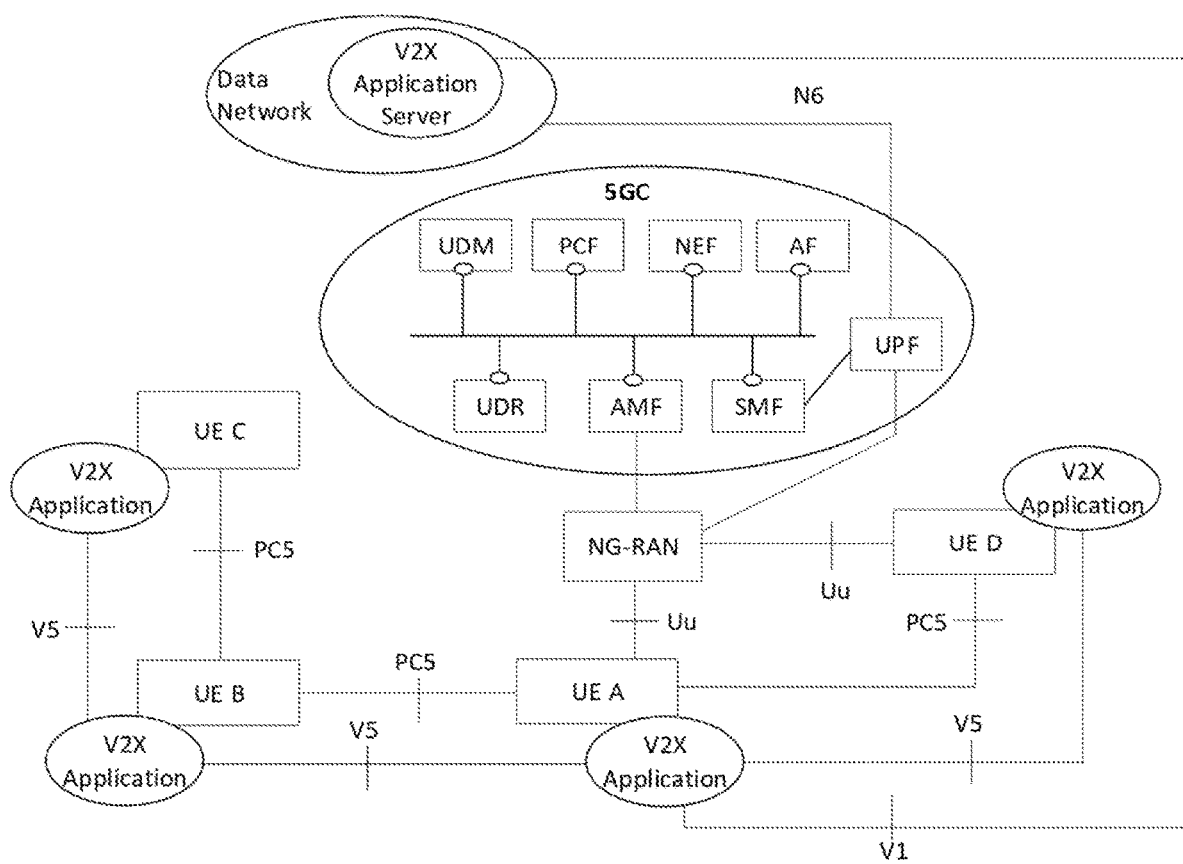
FIG. 1 shows the high level view of the non-roaming 5G System (5GS) architecture for vehicle-to-everything (V2X) communication.
Figure 2:
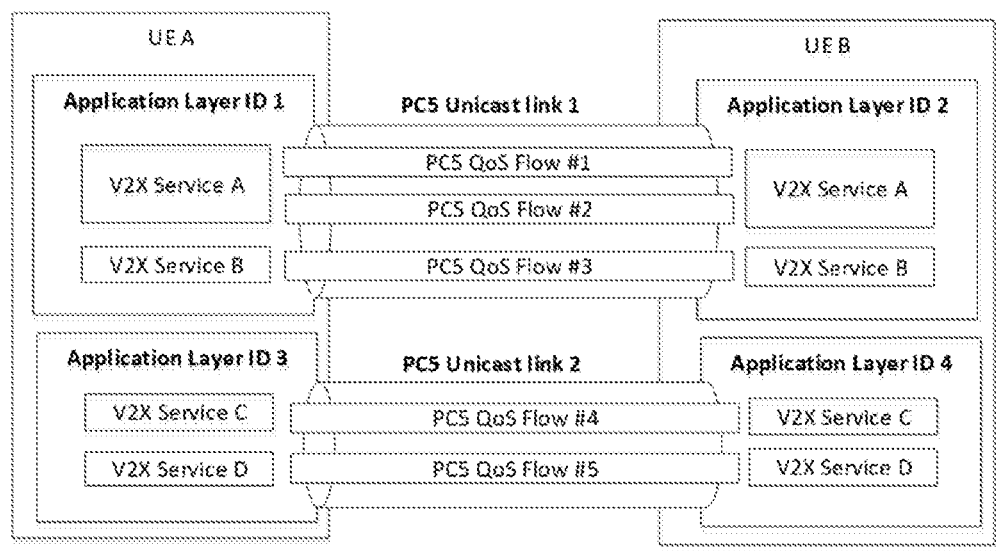
FIG. 2 illustrates two UEs having two PC5 unicast links.
Figure 3:
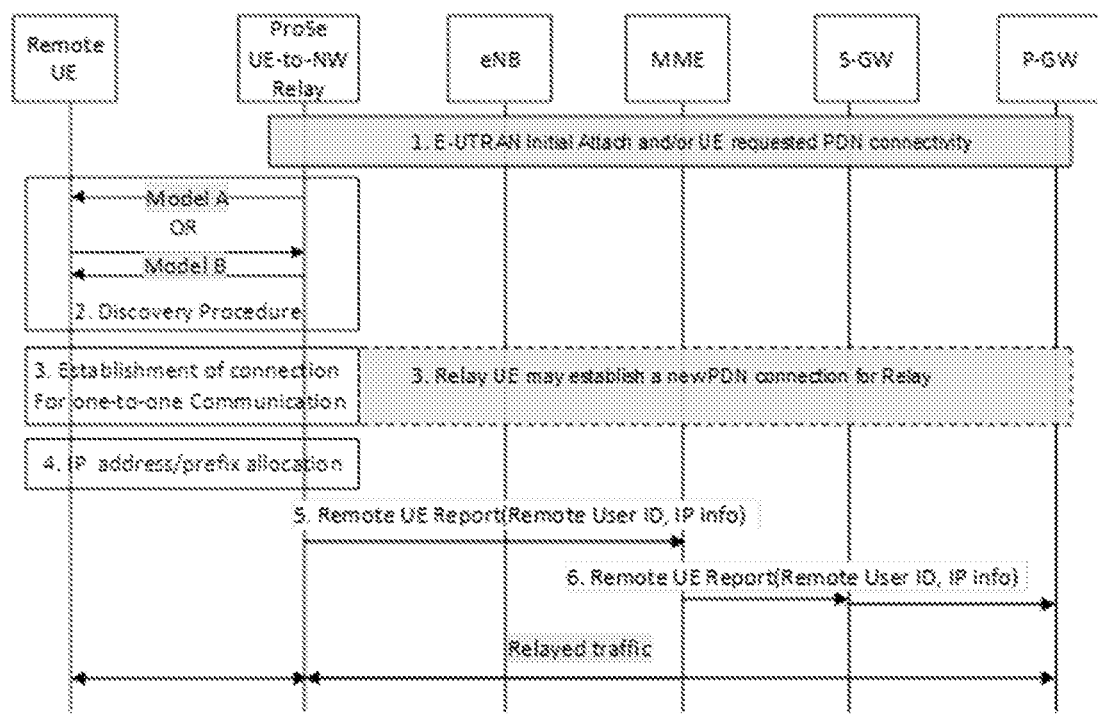
FIG. 3 illustrates a call flow.
Figure 4:
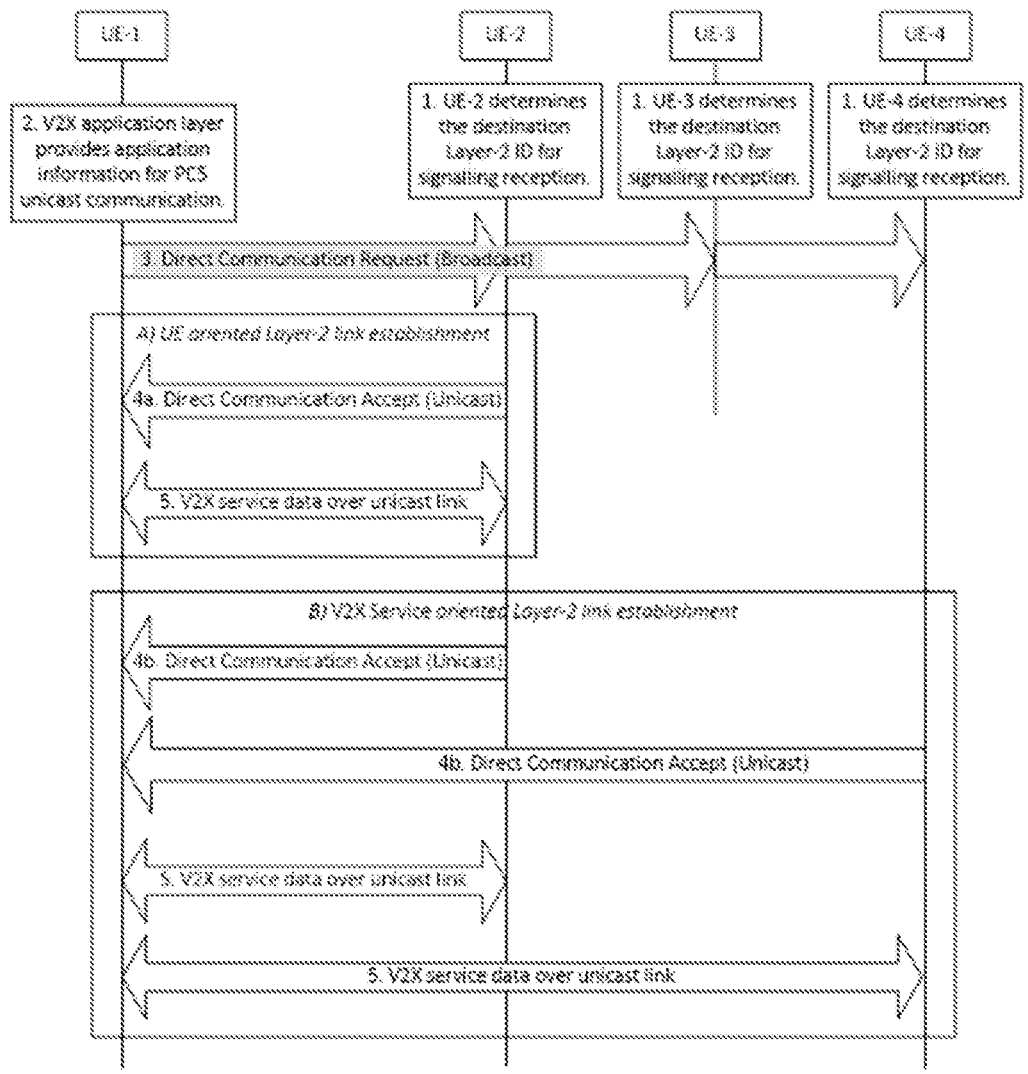
FIG. 4 shows the layer-2 link establishment procedure for unicast mode of V2X communication over PC5 reference point.

For example, if the AUSF is responsible for the key management, the AUSF can provide the public key to the UE in step 9 of FIG. 4.2.2.2.2-1 in TS 23.502-060 after the UE is successfully authentication itself to the network.

Alternatively, the AMF can send a new type of message, say ProSe_TokenKey_Request to AUSF to get the public key and send it to the UE, e.g. after step 14b in procedure of FIG. 4.2.2.2.2-1 in TS 23.502-060. Or the UDM can use ProSe_TokenKey_Request to get the key from AUSF and provide the public key in its token response message.

If a PKMF is responsible for the key management, then UEs can access to the PKMF via the user plane and send the key request, e.g. step 1a in FIG. 6.7.3.2.1.1-1 in TS 33.303-16.0.0. Then the PKMF can provide the public key to the UE in the response message.

1.2 Authorization Certificate is Generated by an Application Server Function:

In another embodiment, an Application Server function (AS) 522 can also be the candidate for generating the authorization token and digital signature. In that case, the UE access the AS via the user plane for application level authorization. The AS 522 generates (may be with collaboration with PCF, UDM via NEF) and signs the token and gives it to the UE as well as the key for verifying tokens from other UEs. In this case, the application server will maintain the public/private key by itself.

Figure 8A:
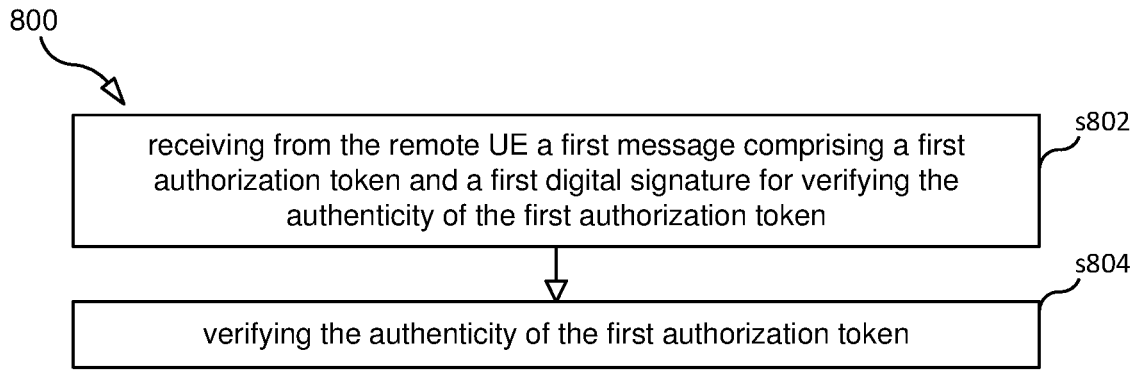
FIG. 8A is a flowchart illustrating a process according to some embodiments.

FIG. 8A is a flowchart illustrating a process 800, according to an embodiment, that is performed by relay UE 502 for determining whether the relay UE may provide a relay service to remote UE 501. Process 800 may begin in step s802.

Step s802 comprises the relay UE receiving from the remote UE a first message comprising a first authorization token and a first digital signature for verifying the authenticity of the first authorization token, wherein the first digital signature was generated by a first network node using the first authorization token and a first key, and the first authorization token indicates whether or not the remote UE is authorized to utilize a relay service provided by the relay UE.

Step s804 comprises the relay UE verifying the authenticity of the first authorization token.

In some embodiments process 800 further includes the relay UE transmitting to the remote UE a second message comprising a second authorization token and a second digital signature for verifying the authenticity of the second authorization token, wherein the second digital signature was generated by a second network function or the first network function, and the second authorization token indicates that the relay UE is authorized to provide a relay service to the remote UE.

In some embodiments the second digital signature was generated using the first key.

In some embodiments process 800 further includes, prior to the relay UE transmitting to the remote UE the second message comprising the second authorization token, the relay UE receiving a third message comprising the second authorization token and the second digital signature.

In some embodiments the third message is a registration response message transmitted by a management function (MF) as part of a procedure for registering the relay UE.

In some embodiments the third message was transmitted to the relay UE by a ProsSe function or an Application Function.

In some embodiments the third message further comprises a second key paired with the first key.

In some embodiments the first authorization token further includes one or more of the following: information specifying a time at which the first authorization token expires, a UE identifier associated with the remote UE or with a group of UEs that includes the remote UE, relay type information identifying a type of relay UE that the remote UE is authorized to utilize, layer information indicating whether the remote UE supports layer-2 relaying and/or layer-3 relaying, location information identifying one or more geographical areas, or quality-of-service (Qos) information.

In some embodiments the step of verifying the authenticity of the first authorization token comprises the relay UE using the first digital signature and a second key paired with the first key to verify the authenticity of the first authorization token.

In some embodiments the step of verifying the authenticity of the first authorization token comprises the relay UE requesting a network function to verify the authenticity of the first authorization token.

In some embodiments the first authorization token comprises a UE identifier that identifies a particular UE, and the method further comprises the relay UE determining whether the remote UE is the particular UE identified by the UE identifier, or the first authorization token comprises a UE identifier that identifies a group of UEs, and the method further comprises the relay UE determining whether the remote UE is included in the group of UEs identified by the UE identifier.

Figure 8B:
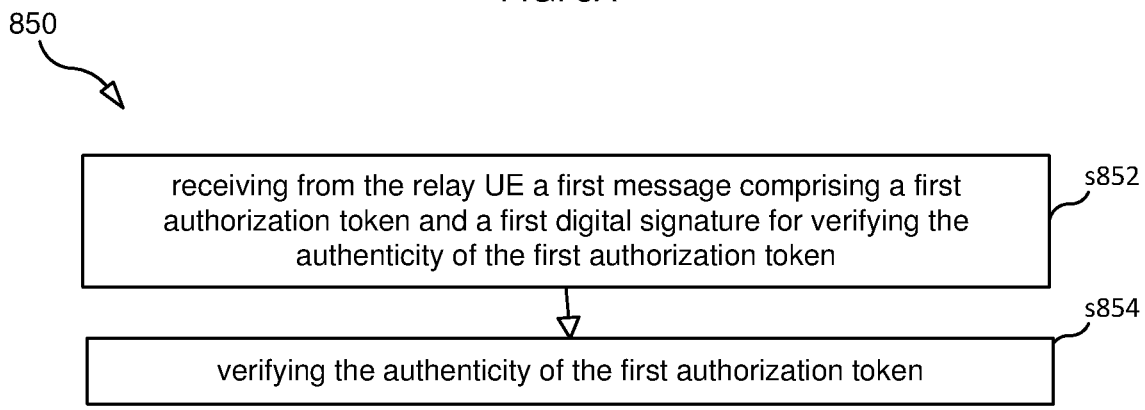
FIG. 8B is a flowchart illustrating a process according to some embodiments.

FIG. 8B is a flowchart illustrating a process 850, according to an embodiment, that is performed by remote UE 501 for determining whether the relay UE may provide a relay service to the remote UE. Process 850 may begin in step s852.

Step s852 comprises the remote UE receiving from the relay UE a first message comprising a first authorization token and a first digital signature for verifying the authenticity of the first authorization token, wherein the first digital signature was generated by a first network node using the first authorization token and a first key, and the first authorization token indicates whether or not the relay UE is authorized to provide a relay service to the remote UE.

Step s854 comprises the remote UE verifying the authenticity of the first authorization token.

In some embodiments process 850 also includes the remote UE transmitting to the relay UE a second message comprising a second authorization token and a second digital signature for verifying the authenticity of the second authorization token, wherein the second digital signature was generated by a second network function or the first network function, and the second authorization token indicates that the remote UE is authorized to utilize a relay service provided by the relay UE.

In some embodiments the second digital signature was generated using the first key.

In some embodiments process 850 also includes, prior to the remote UE transmitting to the relay UE the second message comprising the second authorization token, the remote UE receiving a third message comprising the second authorization token and the second digital signature.

In some embodiments the third message is a registration response message transmitted by a management function (MF) as part of a procedure for registering the remote UE.

In some embodiments the third message was transmitted to the remote UE by a ProsSe function or an Application Function.

In some embodiments the third message further comprises a second key paired with the first key.

In some embodiments the first authorization token further includes one or more of the following: information specifying a time at which the first authorization token expires, a UE identifier associated with the relay UE or with a group of UEs that includes the relay UE, service types that the relay UE supports, application types that the relay UE supports, traffic types that the relay UE supports, remote UE type information identifying a type of remote UE that the relay UE is authorized to serve, layer information indicating whether the relay UE supports layer-2 relaying and/or layer-3 relaying, a list of one or more PLMN identifies identying PLMN that the relay is authorized to access, location information identifying one or more geographical areas, or quality-of-service (Qos) information.

In some embodiments the step of verifying the authenticity of the first authorization token comprises the remote UE using the first digital signature and a second key paired with the first key to verify the authenticity of the first authorization token.

In some embodiments the step of verifying the authenticity of the first authorization token comprises the remote UE requesting a network function to verify the authenticity of the first authorization token.

In some embodiments the first authorization token comprises a UE identifier that identifies a particular UE, and the method further comprises the remote UE determining whether the relay UE is the particular UE identified by the UE identifier, or the first authorization token comprises a UE identifier that identifies a group of UEs, and the method further comprises the remote UE determining whether the relay UE is included in the group of UEs identified by the UE identifier.

Figure 8C:
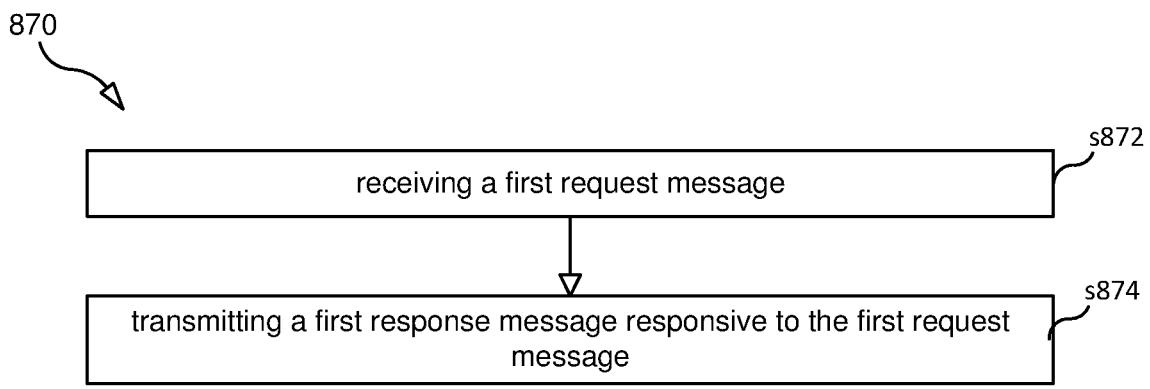
FIG. 8C is a flowchart illustrating a process according to some embodiments.

FIG. 8C is a flowchart illustrating a process 870, according to an embodiment, that is performed by a network node (e.g., AMF 508, UDM 518, ProSe function 520, AS 522, etc). Process 870 may begin in step s872. Step s872 comprises the network node receiving a first request message. Step s874 comprises the network node transmitting a first response message responsive to the first request message, wherein the first response message comprises an authorization token and a digital signature for verifying the authenticity of the authorization token, the digital signature was generated using a first key, and the authorization token indicates at least one of: i) that a UE (e.g., UE 501 or UE 502) is authorized to utilize a relay service provided by one or more relay UEs (e.g., UE 502) or ii) that the UE is authorized to provide a relay service to one or more remote UEs (e.g., UE 501).

In some embodiments the first response message further comprises a second key that is paired with the first key, which second key can be used to verify the authenticity of the authorization token.

In some embodiments the first network node comprises a ProSe function (520), a User Data Management (UDM) function (518), or an application server function (522).

In some embodiments the first network node comprises a management function (MF) (508) (e.g., an Access and Mobility Management Function (AMF)).

In some embodiments the first request message is a Registration Request message and the first response message is a Registration Response message.

In some embodiments process 870 further includes, after receiving the first request message and prior to transmitting the first response message, transmitting a second request message to a network function (e.g., UDM (518)); and receiving a second response message transmitted by the network function in response to the second request message, wherein the second response message comprises the authorization token.

In some embodiments the second response message further comprises the digital signature and the second key paired with the first key for verifying the authenticity of the authorization token.

Figure 9:
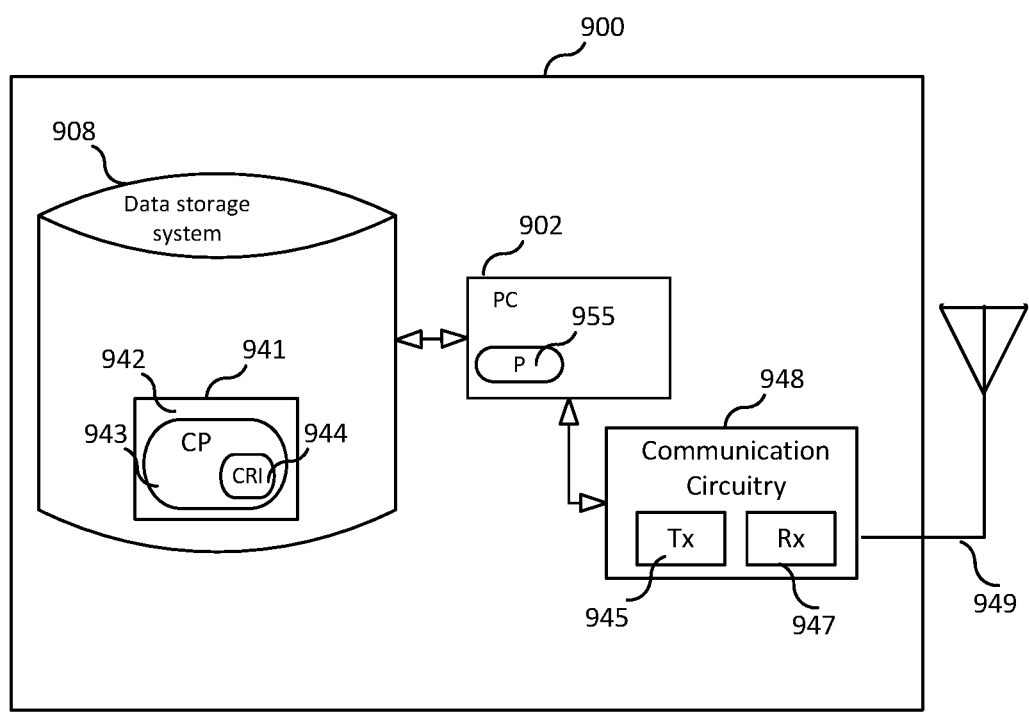
FIG. 9 is a block diagram of a UE according to some embodiments.

FIG. 9 is a block diagram of a UE 900 (e.g., UE 501 or UE 502), according to some embodiments. As shown in FIG. 9, UE 900 may comprise: processing circuitry (PC) 902, which may include one or more processors (P) 955 (e.g., one or more general purpose microprocessors and/or one or more other processors, such as an application specific integrated circuit (ASIC), field-programmable gate arrays (FPGAs), and the like); communication circuitry 948, which is coupled to an antenna arrangement 949 comprising one or more antennas and which comprises a transmitter (Tx) 945 and a receiver (Rx) 947 for enabling UE 900 to transmit data and receive data (e.g., wirelessly transmit/receive data); and a local storage unit (a.k.a., "data storage system") 908, which may include one or more non-volatile storage devices and/or one or more volatile storage devices. In embodiments where PC 902 includes a programmable processor, a computer program product (CPP) 941 may be provided. CPP 941 includes a computer readable medium (CRM) 942 storing a computer program (CP) 943 comprising computer readable instructions (CRI) 944. CRM 942 may be a non-transitory computer readable medium, such as, magnetic media (e.g., a hard disk), optical media, memory devices (e.g., random access memory, flash memory), and the like. In some embodiments, the CRI 944 of computer program 943 is configured such that when executed by PC 902, the CRI causes UE 900 to perform steps described herein (e.g., steps described herein with reference to the flow charts). In other embodiments, UE 900 may be configured to perform steps described herein without the need for code. That is, for example, PC 902 may consist merely of one or more ASICs. Hence, the features of the embodiments described herein may be implemented in hardware and/or software.

Figure 10:
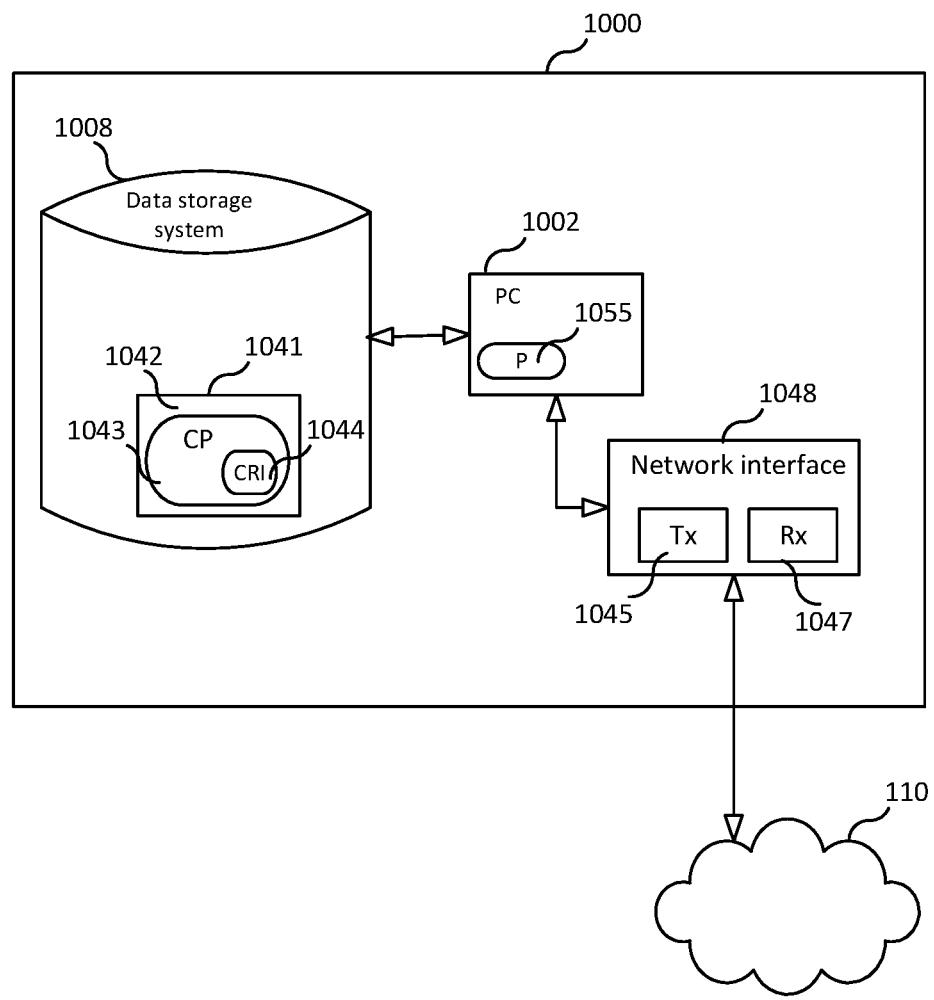
FIG. 10 is a block diagram of a network node according to some embodiments.

FIG. 10 is a block diagram of an apparatus 1000 (a.k.a., "network node 1000"), according to some embodiments, for performing methods disclosed herein (e.g., for implementing any one or more of the network functions described herein). As shown in FIG. 10, apparatus 1000 may comprise: processing circuitry (PC) 1002, which may include one or more processors (P) 1055 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1000 may be a distributed computing apparatus); at least one network interface 1048 comprising a transmitter (Tx) 1045 and a receiver (Rx) 1047 for enabling apparatus 1300 to transmit data to and receive data from other nodes connected to a network 110 (e.g., an Internet Protocol (IP) network) to which network interface 1048 is connected (directly or indirectly) (e.g., network interface 1048 may be wirelessly connected to the network 110, in which case network interface 1048 is connected to an antenna arrangement); and a storage unit (a.k.a., "data storage system") 1008, which may include one or more non-volatile storage devices and/or one or more volatile storage devices. In embodiments where PC 1002 includes a programmable processor, a computer program product (CPP) 1041 may be provided. CPP 1041 includes a computer readable medium (CRM) 1042 storing a computer program (CP) 1043 comprising computer readable instructions (CRI) 1044. CRM 1042 may be a non-transitory computer readable medium, such as, magnetic media (e.g., a hard disk), optical media, memory devices (e.g., random access memory, flash memory), and the like. In some embodiments, the CRI 1044 of computer program 1043 is configured such that when executed by PC 1002, the CRI causes apparatus 1000 to perform steps described herein (e.g., steps described herein with reference to the flow charts). In other embodiments, apparatus 1000 may be configured to perform steps described herein without the need for code. That is, for example, PC 1002 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] 3GPP TS 23.287 V16.2.0 ("TS 23.287"), Architecture enhancements for 5G System (5GS) to support Vehicle-to-Everything (V2X) services.
[2] 3GPP TR 23.752 V0.3.0 ("TR 23.752"), Study on system enhancement for Proximity based Services (ProSe) in the 5G System (5GS).
[3] 3GPP TS 33.303 V15.10.0 ("TS 33.303") Proximity-based Services (ProSe); Security aspects.
[4] 3GPP TS 23.303 V15.10.0 ("TS 23.303"), Proximity-based services (ProSe).
[5] RFC 6749, IETF OAuth 2.0, (available at tools.ietf.org/html/rfc6749).

The invention claimed is:

1. A method performed by a relay user equipment (UE) for determining whether the relay UE is authorized to provide a relay service to a remote UE, the method comprising:
the relay UE receiving from the remote UE a first message comprising a first authorization token and a first digital signature for verifying the authenticity of the first authorization token, wherein the first digital signature was generated by a first network function implemented in a network using the first authorization token and a first key, and the first authorization token indicates whether or not the remote UE is authorized to utilize a relay service provided by the relay UE;
the relay UE verifying the authenticity of the first authorization token; and
the relay UE transmitting to the remote UE a second message comprising a second authorization token and a second digital signature for verifying the authenticity of the second authorization token, wherein
the second digital signature was generated by a second network function implemented in the network or the first network function, and
the second authorization token indicates that the relay UE is authorized to provide a relay service to the remote UE.
2. The method of claim 1, wherein the second digital signature was generated using the first key.
3. The method of claim 1, further comprising:
prior to the relay UE transmitting to the remote UE the second message comprising the second authorization token, the relay UE receiving a third message comprising the second authorization token and the second digital signature.
4. The method of claim 1, wherein the first authorization token further includes one or more of the following:
information specifying a time at which the first authorization token expires,
a UE identifier associated with the remote UE or with a group of UEs that includes the remote UE,
relay type information identifying a type of relay UE that the remote UE is authorized to utilize,
layer information indicating whether the remote UE supports layer-2 relaying and/or layer-3 relaying,
location information identifying one or more geographical areas, or
quality-of-service (QOS) information.
5. The method of claim 1, wherein the step of verifying the authenticity of the first authorization token comprises the relay UE requesting a network function to verify the authenticity of the first authorization token.
6. The method of claim 1, wherein
the first authorization token comprises a UE identifier that identifies a particular UE, and the method further comprises the relay UE determining whether the remote UE is the particular UE identified by the UE identifier, or
the first authorization token comprises a UE identifier that identifies a group of UEs, and the method further comprises the relay UE determining whether the remote UE is included in the group of UEs identified by the UE identifier.
7. A method performed by a remote user equipment (UE) for determining whether a relay UE is authorized to provide a relay service to the remote UE, the method comprising:
the remote UE receiving from the relay UE a first message comprising a first authorization token and a first digital signature for verifying the authenticity of the first authorization token, wherein the first digital signature was generated by a first network function implemented in a network using the first authorization token and a first key, and the first authorization token indicates whether or not the relay UE is authorized to provide a relay service to the remote UE; and the remote UE verifying the authenticity of the first authorization token; and the remote UE transmitting to the relay UE a second message comprising a second authorization token and a second digital signature for verifying the authenticity of the second authorization token, wherein the second digital signature was generated by a second network function implemented in the network or the first network function, and the second authorization token indicates that the remote UE is authorized to utilize a relay service provided by the relay UE.

8. The method of claim 7, wherein the second digital signature was generated using the first key.

9. The method of claim 7, further comprising:

prior to the remote UE transmitting to the relay UE the second message comprising the second authorization token, the remote UE receiving a third message comprising the second authorization token and the second digital signature.

10. The method of claim 7, wherein the first authorization token further includes one or more of the following:

information specifying a time at which the first authorization token expires, a UE identifier associated with the relay UE or with a group of UEs that includes the relay UE, service types that the relay UE supports, application types that the relay UE supports, traffic types that the relay UE supports, remote UE type information identifying a type of remote UE that the relay UE is authorized to serve, layer information indicating whether the relay UE supports layer-2 relaying and/or layer-3 relaying, a list of one or more Public Land Mobile Network (PLMN) identifies identifying PLMN that the relay is authorized to access, location information identifying one or more geographical areas, or quality-of-service information.

11. The method of claim 7, wherein the step of verifying the authenticity of the first authorization token comprises the remote UE requesting a network function to verify the authenticity of the first authorization token.

12. The method of claim 7, wherein the first authorization token comprises a UE identifier that identifies a particular UE, and the method further comprises the remote UE determining whether the relay UE is the particular UE identified by the UE identifier, or the first authorization token comprises a UE identifier that identifies a group of UEs, and the method further comprises the remote UE determining whether the relay UE is included in the group of UEs identified by the UE identifier.

13. A method performed by a first network node, the method comprising:

receiving a first request message; and transmitting a first response message responsive to the first request message, wherein the first response message comprises an authorization token and a digital signature for verifying the authenticity of the authorization token, the digital signature was generated using a first key, and the authorization token indicates at least one of: i) that a user equipment (UE) is authorized to utilize a relay service provided by one or more relay UEs or ii) that the UE is authorized to provide a relay service to one or more remote UEs.

14. The method of claim 13, wherein the first response message further comprises a second key that is paired with the first key, which second key can be is used to verify the authenticity of the authorization token.

* * * * *